US007911438B2

(12) United States Patent
Okazaki

(10) Patent No.: US 7,911,438 B2
(45) Date of Patent: Mar. 22, 2011

(54) AREA LIGHTING DEVICE AND LIQUID CRYSTAL DISPLAY DEVICE HAVING THE SAME

(75) Inventor: Susumu Okazaki, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 915 days.

(21) Appl. No.: 11/374,785

(22) Filed: Mar. 14, 2006

(65) Prior Publication Data

US 2006/0214905 A1 Sep. 28, 2006

(30) Foreign Application Priority Data

Mar. 22, 2005 (JP) ................................ 2005-081377

(51) Int. Cl.
*G09G 3/36* (2006.01)
*G02F 1/1335* (2006.01)

(52) U.S. Cl. ......................................... 345/102; 349/67

(58) Field of Classification Search ............ 345/87–104; 349/61–67
See application file for complete search history.

(56) References Cited

U.S. PATENT DOCUMENTS 5,489,917 A * 2/1996 Ikezaki et al. .................. 345/89
6,188,380 B1 * 2/2001 Kawashima et al. ......... 345/102
6,304,304 B1 * 10/2001 Koma ............................ 349/33
6,908,224 B2 * 6/2005 Schneider et al. ................ 374/1
7,248,308 B2 * 7/2007 Mizutani et al. ................ 349/67
7,362,403 B2 * 4/2008 Uehara ......................... 349/150
2002/0158857 A1 * 10/2002 Iisaka .......................... 345/204
2004/0095402 A1 * 5/2004 Nakano ........................ 346/102
2004/0119908 A1 6/2004 Sakai
2004/0246435 A1 * 12/2004 Kamei ......................... 349/199
2005/0116921 A1 * 6/2005 Kim ............................. 345/102

FOREIGN PATENT DOCUMENTS

JP 2004-029141 1/2004
JP 2004-199968 A 7/2004

* cited by examiner

*Primary Examiner* — Srilakshmi K Kumar
(74) *Attorney, Agent, or Firm* — Keating & Bennett, LLP

(57) ABSTRACT

The invention relates to an area lighting device using an LED as a light source and a liquid crystals display having the same. An object is to provide an area lighting device which can provide stable display quality and a liquid crystal display device having the same. An area lighting device is configured to have a light source part provided with a plurality of LEDs; a dummy liquid crystal panel which has a pair of substrates and a liquid crystal layer encapsulated between the substrates, and to which light from the light source part partially enters; a chromaticity sensor which senses a chromaticity of light transmitted through the dummy liquid crystal panel; and an LED control part which compares the sensed chromaticity with a set target value, and controls the plurality of the LEDs so that the chromaticity becomes close to the target value.

8 Claims, 9 Drawing Sheets

AREA LIGHTING DEVICE AND LIQUID CRYSTAL DISPLAY DEVICE HAVING THE SAME

BACKGROUND OF THE INVENTION

1. Field of the Invention

The present invention relates to an area lighting device and a liquid crystal display device having the same, particularly to an area lighting device using an LED as a light source and a liquid crystal display device having the same.

2. Description of the Related Art

A liquid crystal display device has a liquid crystal display panel provided with a plurality of pixels arranged in a matrix, and a backlight unit which illuminates light from behind the liquid crystal display panel. The liquid crystal display device drives liquid crystals to control the transmittance of light from the backlight unit at each of the pixels for display. In recent years, in order to expand the color reproduction range (color gamut) of the liquid crystal display device, it is studied to use an LED for the light source of the backlight unit, becoming practical use. In using a plurality of the LEDs, it is necessary to control the balance of the light quantity of each LED because the properties of LEDs are different from one another. Particularly, when LEDs that emit single color lights of red (R), green (G), and blue (B) are combined for use, it is required to control the balance of the light quantity of each of red, green and blue LEDs.

For that scheme, there is a technique in which an optical sensor is disposed on one part of a backlight unit (for example, on the back side of a light guide plate), the optical sensor senses the chromaticity or brightness of light combined with each color of R, G and B, each of the LEDs is feedback controlled based on the sensed chromaticity or brightness, and the balance of the quantity of R, G and B lights is optimized. The optical sensor senses the chromaticity and brightness of the combined lights, and outputs signals depending thereon. The LEDs are driven based on the signals to control the light emission brightness of each of the LEDs, and to control the chromaticity and brightness of light emitted from the backlight unit.

Patent Reference 1: JP-A-2004-29141

To a viewer who views the display screen of a liquid crystal display device, light enters the viewer's eyes which has come out of a backlight unit and passed through a liquid crystal display panel. The optical property of the liquid crystal display panel is changed because of changes in the wavelength property of liquid crystals due to temperature and aging (for example, deterioration in color filters and aging of the wavelength property of liquid crystals). Therefore, since changes in the optical property of the liquid crystal display panel are not reflected even though the chromaticity and brightness of light emitted from the backlight unit is controlled as described above, the display chromaticity and display brightness of the liquid crystals display device are sometimes varied.

FIG. 9 is a graph illustrating the variation over time in display chromaticity in which almost white is displayed on the display screen of a liquid crystal display device of related art. The horizontal axis of the graph depicts the lighting time (minute) of LEDs of a backlight unit, and the vertical axis depicts the display chromaticity of the liquid crystal display device. A line connecting black circles depicts a chromaticity x, and a line connecting white circles depicts a chromaticity y. As shown in FIG. 9, the display chromaticity of the liquid crystal display device is relatively greatly varied right after the LEDs are lighted, and it takes a long time until it becomes stable. As described above, the liquid crystal display device of related art has a problem that display chromaticity and display brightness are varied over time after the LEDs are lighted and display quality is not stabilized.

SUMMARY OF THE INVENTION

An object of the invention is to provide an area lighting device which can provide stable display quality and a liquid crystal display device having the same.

The object can be achieved by an area lighting device including: a light source part in a plane which has a plurality of LEDs; a dummy liquid crystal panel which has a pair of substrates and a liquid crystal layer encapsulated between the pair of the substrates, and to which light from the light source part partially enters; an optical sensor part which senses a chromaticity and/or brightness of light transmitted through the dummy liquid crystal panel; and an LED control part which controls the plurality of the LEDs based on the chromaticity and/or brightness.

According to the invention, an area lighting device which can provide stable display quality and a liquid crystal display device having the same can be implemented.

DESCRIPTION OF THE PREFERRED EMBODIMENT

First Embodiment

Figure 1:
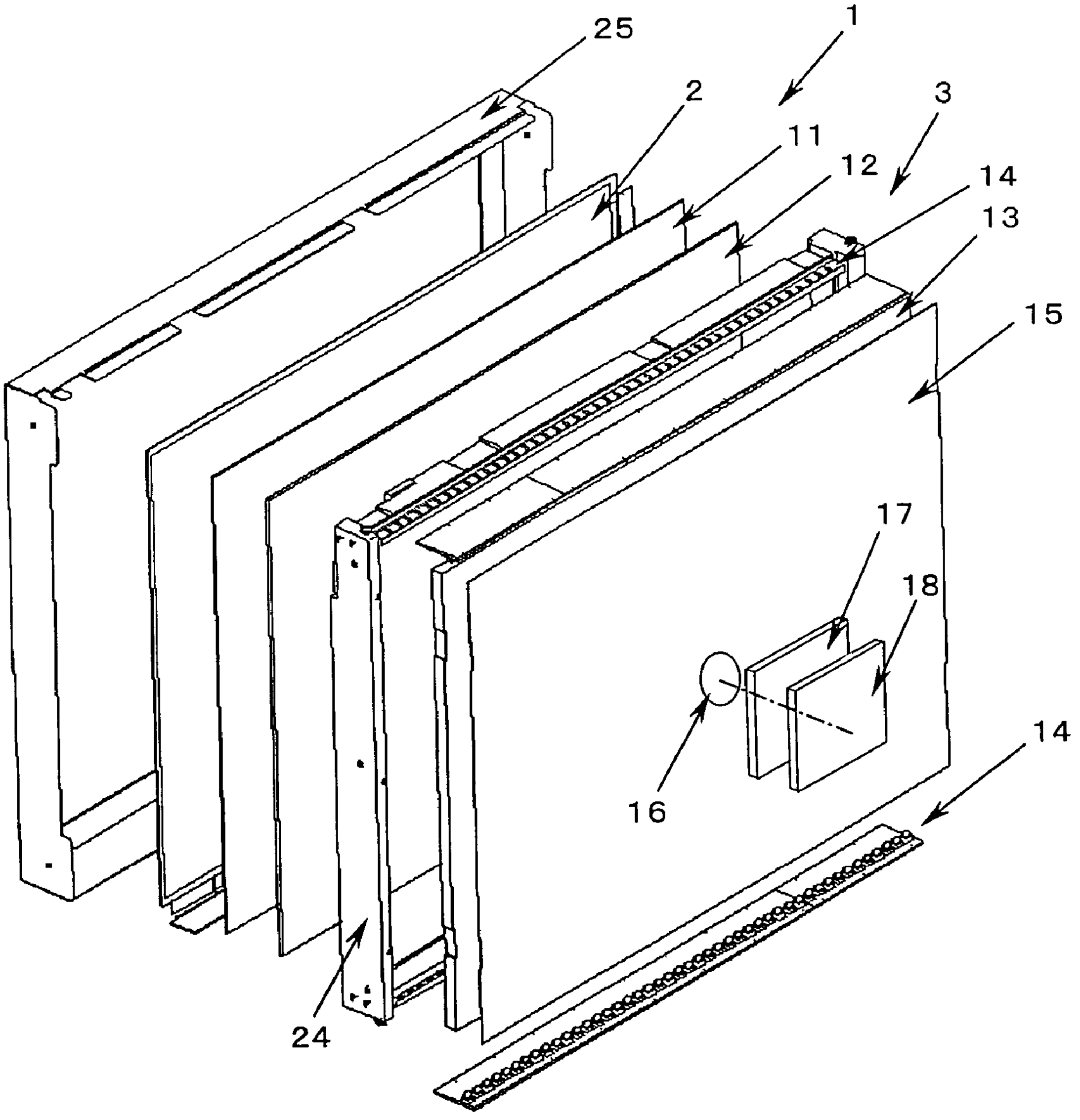
FIG. 1 is an exploded perspective view illustrating the configuration of a liquid crystals display device of a first embodiment according to the invention.
Figure 2:
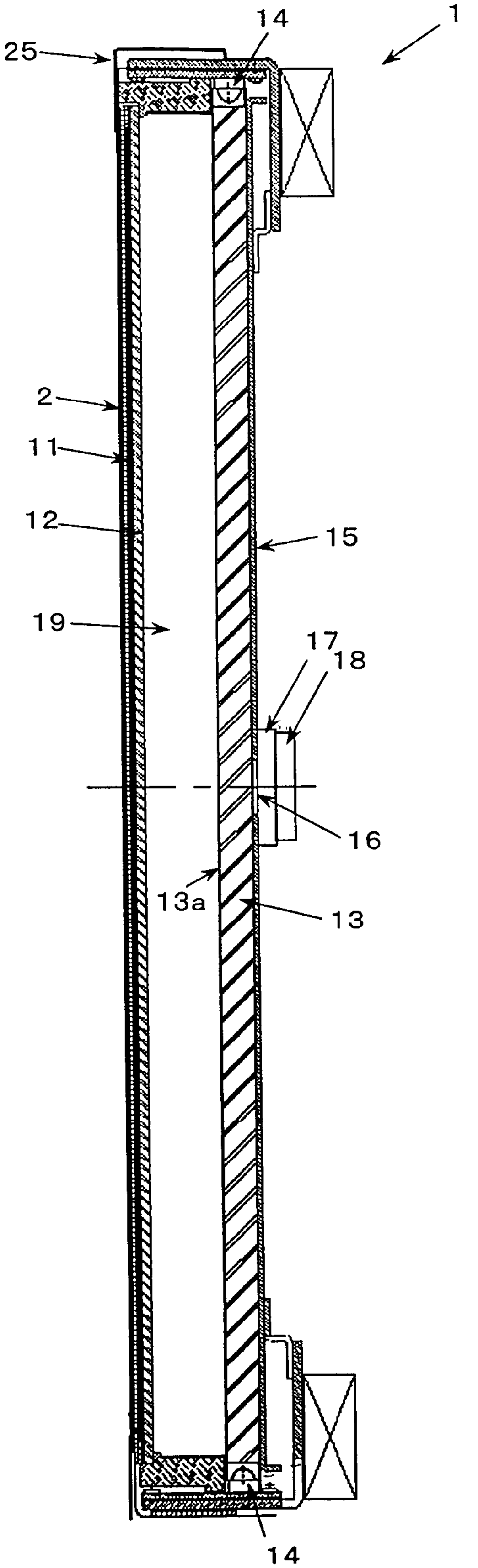
FIG. 2 is a cross section illustrating the configuration of the liquid crystal display device of the first embodiment according to the invention.
Figure 3:
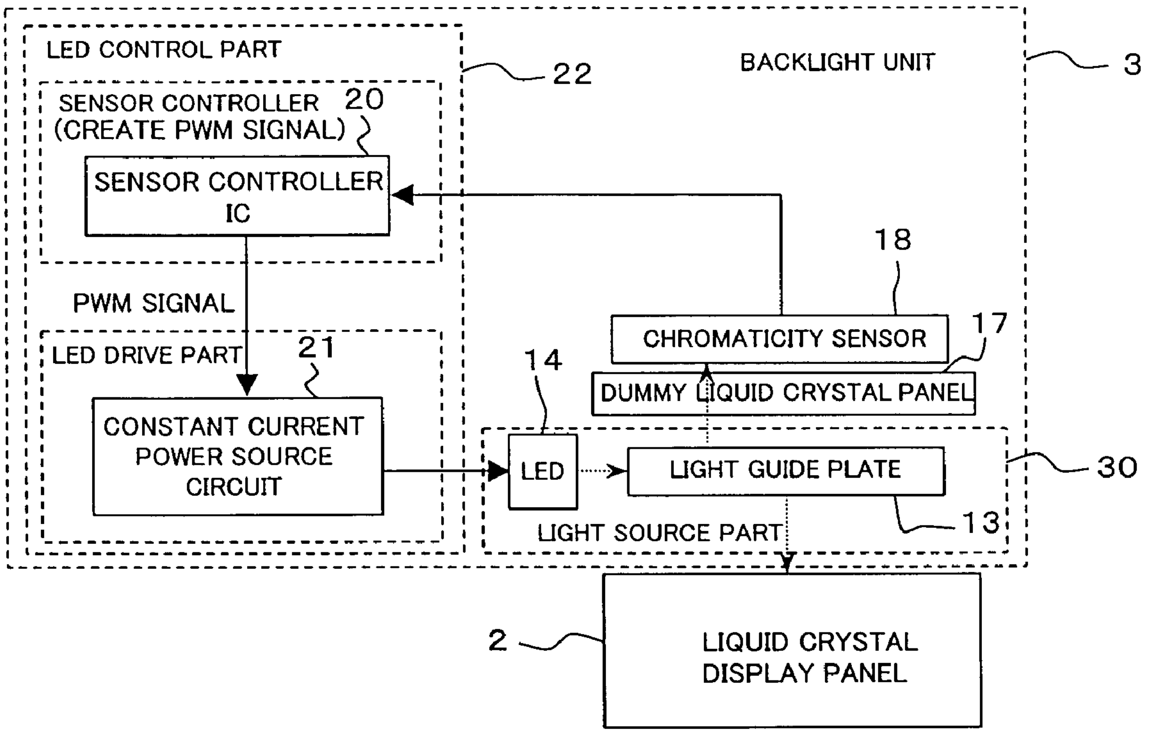
FIG. 3 is a block diagram illustrating the schematic configuration of the liquid crystal display device of the first embodiment according to the invention.

An area lighting device and a liquid crystal display device having the same of a first embodiment according to the invention will be described with reference to FIGS. 1 to 5. FIG. 1 is an exploded perspective view illustrating the configuration of the liquid crystal display device according to the embodiment, and FIG. 2 is a cross section illustrating the configuration of the liquid crystal display device according to the embodiment. Furthermore, FIG. 3 is a block diagram illustrating the schematic configuration of the liquid crystal display device according to the embodiment. As shown in FIGS. 1 to 3, a liquid crystal display device 1 has a transmissive liquid crystal display panel 2, and a backlight unit (an area lighting device) 3 which illuminates the liquid crystal display panel 2. The liquid crystal display panel 2 has a pair of substrates, a liquid crystal layer encapsulated between the both substrates, and a pair of polarizers which sandwich the both substrates and are disposed thereoutside. Between the liquid crystal display panel 2 and the backlight unit 3, optical sheets such as a polarizing sheet 11 and a diffusing sheet 12 are disposed. The liquid crystal display panel 2 performs display by driving liquid crystals to control the transmittance of light from the backlight unit 3 at each of pixels.

The backlight unit 3 has a light source part 30 which has a light guide plate 13 in a plane with a light emitting surface 13*a* in a rectangular plane shape, for example, on the liquid crystal display panel 2 side, and an LED module which is, for example, disposed on two end sides facing each other of the light guide plate 13 and formed of a plurality of LEDs 14 having luminous colors different from one another, for example. The LED 14, for example, includes a plurality of R-LEDs which emits red light, a plurality of G-LEDs which emits green light, and a plurality of B-LEDs which emits blue light. The R-LEDs, G-LEDs and B-LEDs can be driven separately, and emit light in the light emission brightness proportional to the drive current of each LED, for example. Between the light emitting surface 13*a* and the diffusing sheet 12, for example, a predetermined thickness of an air space 19 is disposed. On the back side of the light emitting surface 13*a* of the light guide plate 13, diffusion dots are disposed. Furthermore, a reflective sheet 15 is disposed as it faces the surface on which the diffusion dots of the light guide plate 13 are disposed. The light emitted from each of the LEDs 14 enters the light guide plate 13 in which the light is guided, and mainly comes out of the light emitting surface 13*a* through the diffusion dots and the reflective sheet 15. The light emitted from the light emitting surface 13*a* passes through the air space 19 and the optical sheets, and enters the liquid crystal display panel 2. The light incident to the liquid crystal display panel 2 transmits the liquid crystal display panel 2 at a predetermined transmittance for each of the pixels, and enters the eyes of a viewer. The backlight unit 3, the optical sheets, and the liquid crystal display panel 2 are accommodated and held by a plastic frame 24 and a front cover 25.

Nearly at the center of the reflective sheet 15, a circular opening 16, for example, is formed. The light guided in the light guide plate 13 is partially emitted on the back side of the light emitting surface 13*a* through the opening 16. On the back side of the reflective sheet 15, a dummy liquid crystal panel 17 is disposed which is actually not used for display. The light emitted on the back side of the light emitting surface 13*a* through the opening 16 enters the dummy liquid crystal panel 17, as it does not pass through the liquid crystal display panel 2. The dummy liquid crystal panel 17 has a pair of substrates, a liquid crystal layer encapsulated between the both substrates, and a pair of polarizers disposed outside as sandwiching the both substrates. Liquid crystals used for the dummy liquid crystal panel 17 are the same as the liquid crystals used for the liquid crystal display panel 2, for example. Desirably, on the both substrates, electrodes, an insulating film, color filters and so on are formed almost the same layer configuration as that of the pair of the substrates of the liquid crystal display panel 2. Moreover, preferably, an alignment film is formed on the interface between the both substrates and the liquid crystal layer. The dummy liquid crystal panel 17 has almost the same or similar configuration as that of the liquid crystal display panel 2, except that the panel area is smaller than that of the liquid crystal display panel 2, and has almost the same or similar optical property (transmission property) as that of the liquid crystal display panel 2. It is fine that the optical property of the dummy liquid crystal panel 17 is changed almost the same as the optical property of the liquid crystal display panel 2 caused by changes in the wavelength property of liquid crystals due to temperature and aging. Therefore, for example, the dummy liquid crystal panel 17 may not have color filters. When the color filter is not provided, the factor of changes in the color filter is not reflected, but the property of liquid crystals is reflected. Thus, the object of the invention can be approximately achieved. Similarly, the dummy liquid crystal panel can be simplified when the optical property resembles the liquid crystal display panel 2. Furthermore, for example, when the liquid crystal display panel 2 is in a normally black mode, the dummy liquid crystal panel 17 is also set in the normally black mode. A voltage applying part, not shown, always applies white voltage, for example, to the liquid crystal layer of the dummy liquid crystal panel 17, and the dummy liquid crystal panel 17 is in the state to transmit light.

When the liquid crystal display panel 2 is in a normally white mode, the dummy liquid crystal panel 17 is also set in the normally white mode. Moreover, even though the liquid crystal display panel 2 is in the normally black mode, the dummy liquid crystal panel 17 may be set in the normally white mode. The dummy liquid crystal panel 17 is set in the normally white mode, and then light is made to transmit the dummy liquid crystal panel 17 even though voltage is not applied to the liquid crystal layer. Therefore, the voltage applying part is unnecessary which applies voltage to the liquid crystal layer of the dummy liquid crystal panel 17, allowing implementation of reductions in dimensions, cost, and power consumption. In the case in which the liquid crystal display panel 2 in the normally black mode, for example, has vertically aligned liquid crystals with negative dielectric constant anisotropy and polarizers in cross nicol arrangement, in order to set the dummy liquid crystal panel 17 to the normally white mode as the configuration resembled to that of the liquid crystal display panel 2 is maintained, the polarizers of the dummy liquid crystal panel 17 may be arranged in parallel nicol.

On the back side of the dummy liquid crystal panel 17, a chromaticity sensor (an optical sensor part) 18 is disposed. The chromaticity sensor 18 has a light receiving surface on which light is received that has entered the dummy liquid crystal panel 17 from the light guide plate 13 and transmitted the dummy liquid crystal panel 17. The chromaticity sensor 18 senses the chromaticity of the received light, and outputs a predetermined chromaticity signal in accordance with the chromaticity. In addition, instead of the chromaticity sensor 18, a brightness sensor may be used as the optical sensor part, which senses the brightness of light and outputs a predetermined brightness in accordance with the brightness, or both of the chromaticity sensor 18 and the brightness sensor may be used.

The chromaticity signal outputted from the chromaticity sensor 18 is inputted to a sensor controller IC 20 of an LED control part 22. The sensor controller IC 20 to which the chromaticity signal is inputted compares the chromaticity of light transmitted through the dummy liquid crystal panel 17 with a preset target value of chromaticity, and creates and outputs PWM signals that control the currents to be carried through the R-LED, the G-LED and the B-LED so that the chromaticity becomes close to the target value. The PWM signals outputted from the sensor controller IC 20 are inputted to a constant current power source circuit 21 of an LED drive part. The constant current power source circuit 21 flows a predetermined current through each of the R-LED, the G-LED and the B-LED based on the inputted PWM signals. As described above, the LED control part 22 feedback controls the current amount carried through the LED 14 based on the chromaticity (or brightness) of light transmitted through the dummy liquid crystal panel 17.

Figure 4:
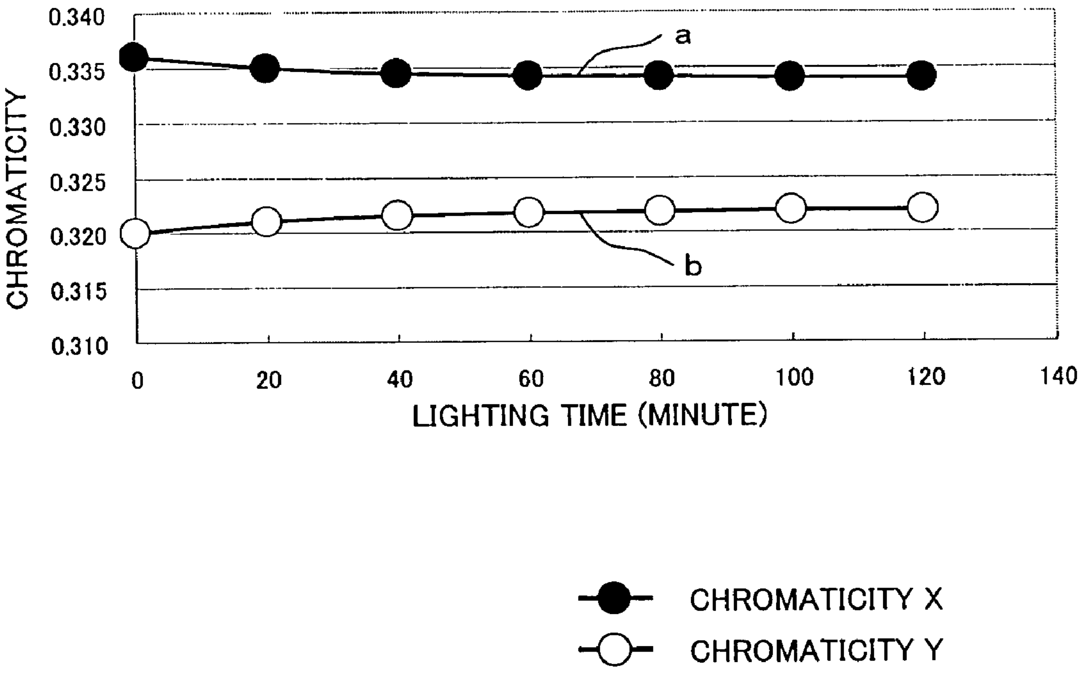
FIG. 4 is a graph illustrating the variation over time in the display chromaticity of the liquid crystal display device of the first embodiment according to the invention.
Figure 9:
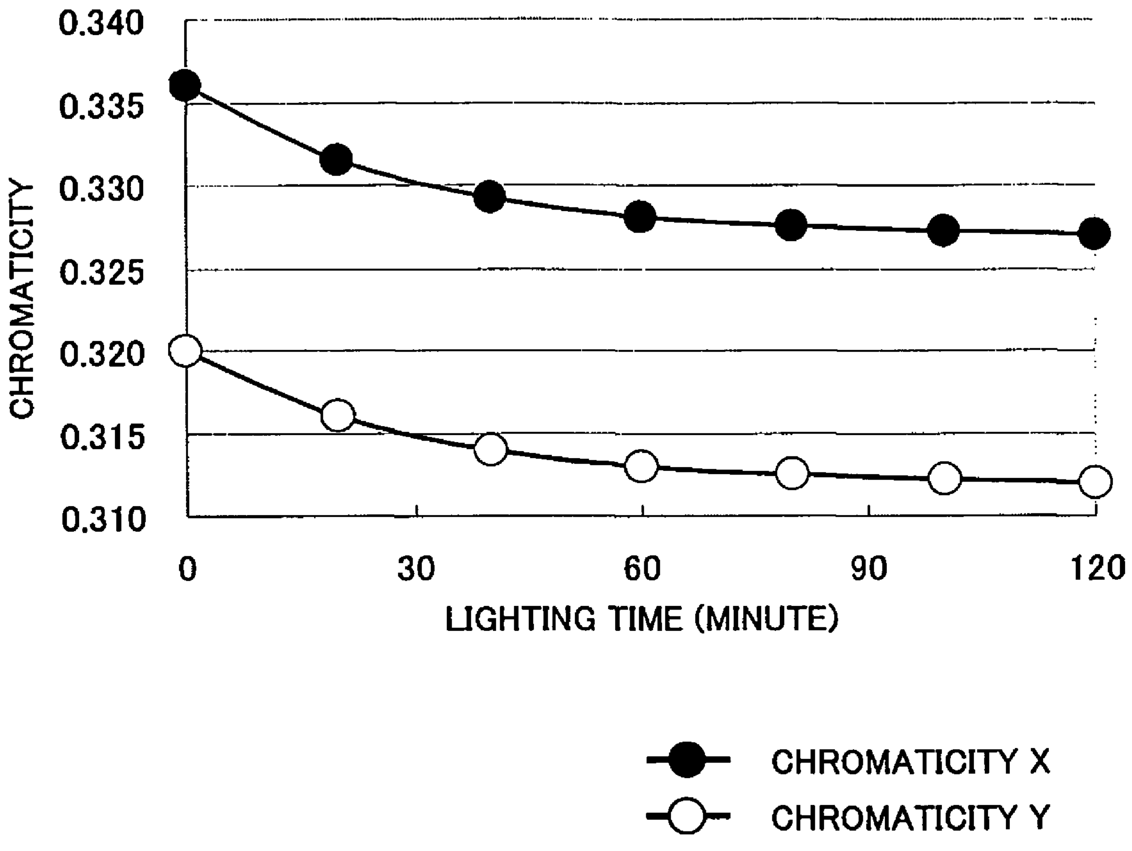
FIG.9 PRIOR ART
FIG. 9 is a graph illustrating the variation over time in the display chromaticity of the liquid crystal display device of related art.

FIG. 4 is a graph illustrating the variation over time in the display chromaticity of the liquid crystal display device according to the embodiment. The horizontal axis of the graph depicts the lighting time (minute) of the LED, and the vertical axis depicts the display chromaticity of the liquid crystal display device. Line a connecting black circles depicts the variation over time in chromaticity x, and line b connecting white circles depicts the variation over time in chromaticity y. As already shown in FIG. 9, the display chromaticity of the liquid crystal display device of related art is relatively greatly varied right after the LED is lighted, and it takes time until it becomes stable. This is caused by lighting the LED to rise the temperature of the liquid crystal display panel to vary the wavelength property of liquid crystals. On the other hand, in the liquid crystal display device according to the embodiment, as shown in FIG. 4, the display chromaticity is relatively stable from the time right after the LED is lighted.

Figure 5:
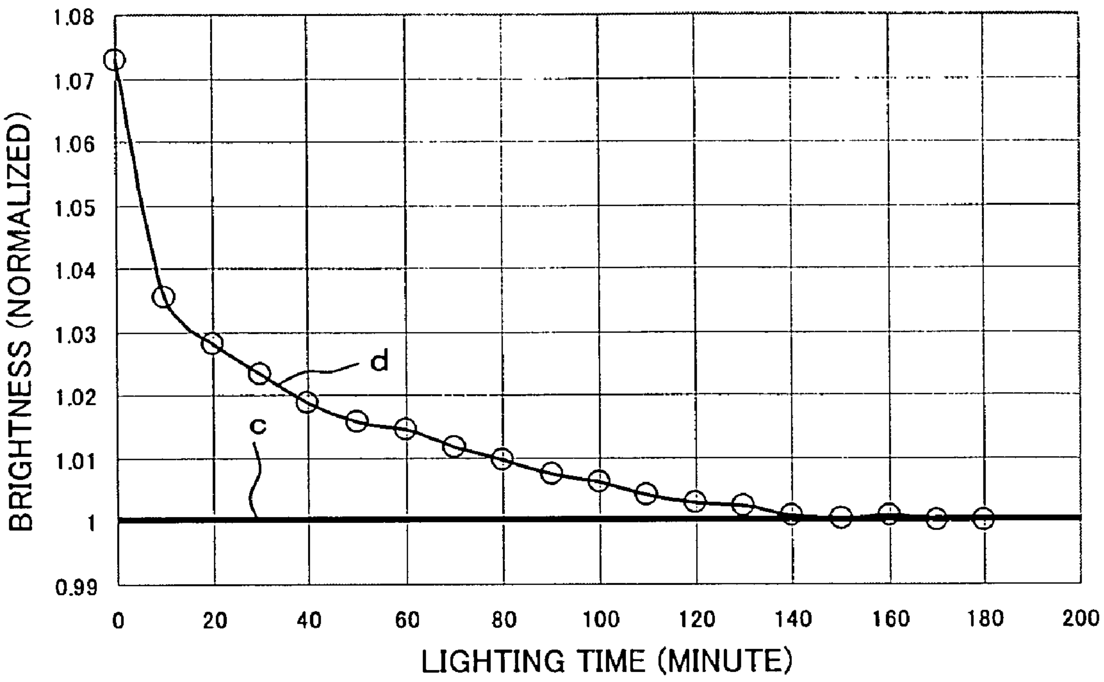
FIG. 5 is graph illustrating the variations over time in the display brightness of the liquid crystal display device of the first embodiment according to the invention and a liquid crystal display device of related art.

FIG. 5 is a graph illustrating the variations over time in the display brightness of the liquid crystal display device according to the embodiment and the liquid crystal display device of related art. The horizontal axis of the graph depicts the lighting time (minute) of the LED, and the vertical axis depicts the display brightness of the liquid crystal display device. Here, the display brightness is normalized as the display brightness after stabilized is one. Line c depicts the variation over time in the display brightness of the liquid crystal display device according to the embodiment, and line d depicts the variation over time in the display brightness of the liquid crystal display device of related art. As shown in FIG. 5, the display brightness of the liquid crystal display device of related art is the highest right after the LED is lighted, gradually dropped over the LED lighting time, and stabilized after the LED is lighted for about 150 minutes (line d). On the other hand, the display brightness of the liquid crystal display device according to the embodiment is almost constant regardless of the LED lighting time (line c).

The embodiment is provided with the dummy liquid crystal panel 17 which has almost the same optical property as that of the liquid crystal display panel 2 and to which the light from the light source part 30 partially enters, and the optical sensor part which senses the chromaticity of light and/or brightness transmitted through the dummy liquid crystal panel 17. The optical property of the dummy liquid crystal panel 17 is varied almost similar to the optical property of the liquid crystal display panel 2 caused by changes in the wavelength property of liquid crystals due to temperature and aging. The current amount to be carried through the LED 14 is feedback controlled based on the chromaticity and/or brightness of light transmitted through the dummy liquid crystal panel 17, the display brightness and display chromaticity of the liquid crystal display device are not varied even though changes occur in the optical property of the liquid crystal display panel 2, and stable display quality can be obtained.

Second Embodiment

Figure 6:
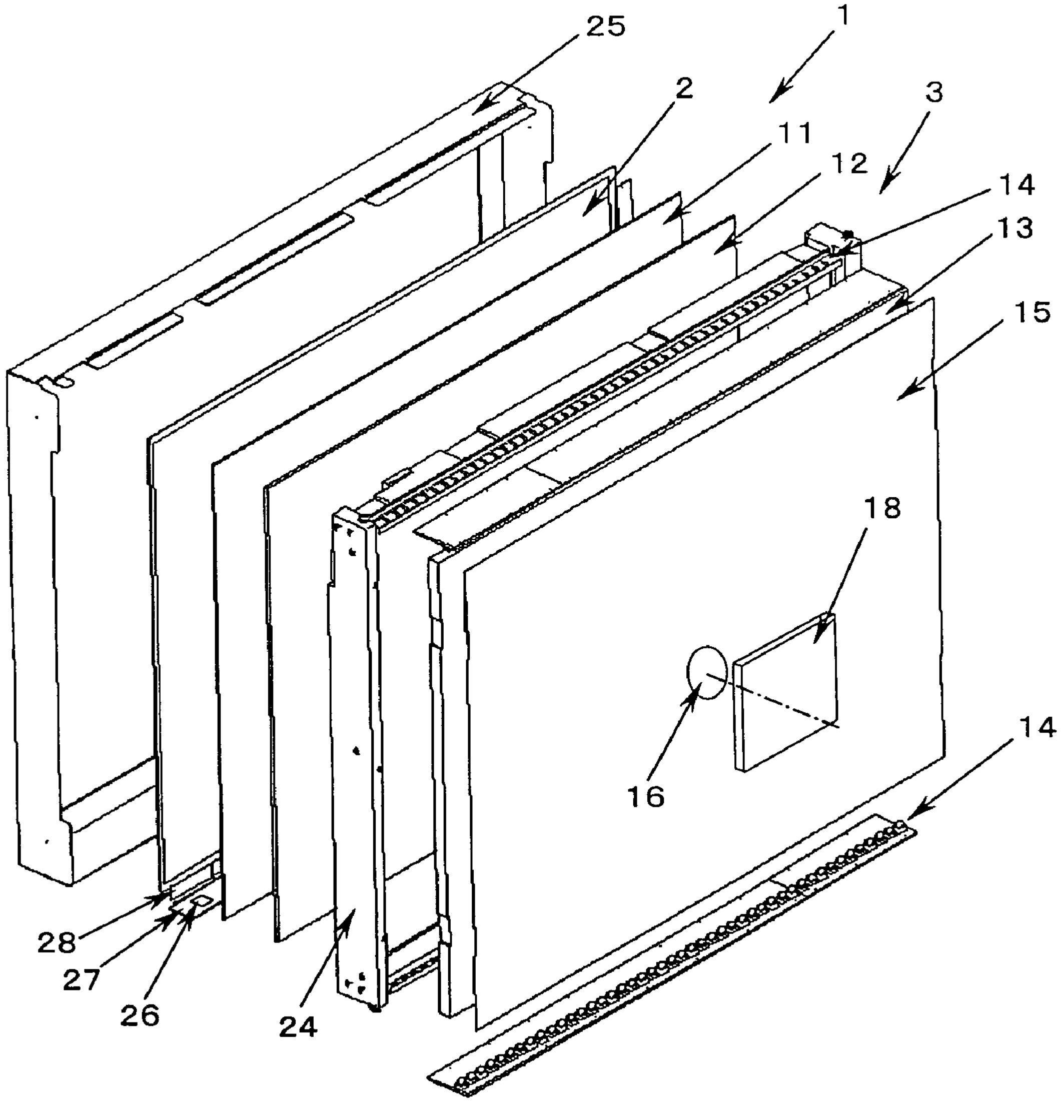
FIG. 6 is an exploded perspective view illustrating the configuration of a liquid crystal display device of a second embodiment according to the invention.
Figure 7:
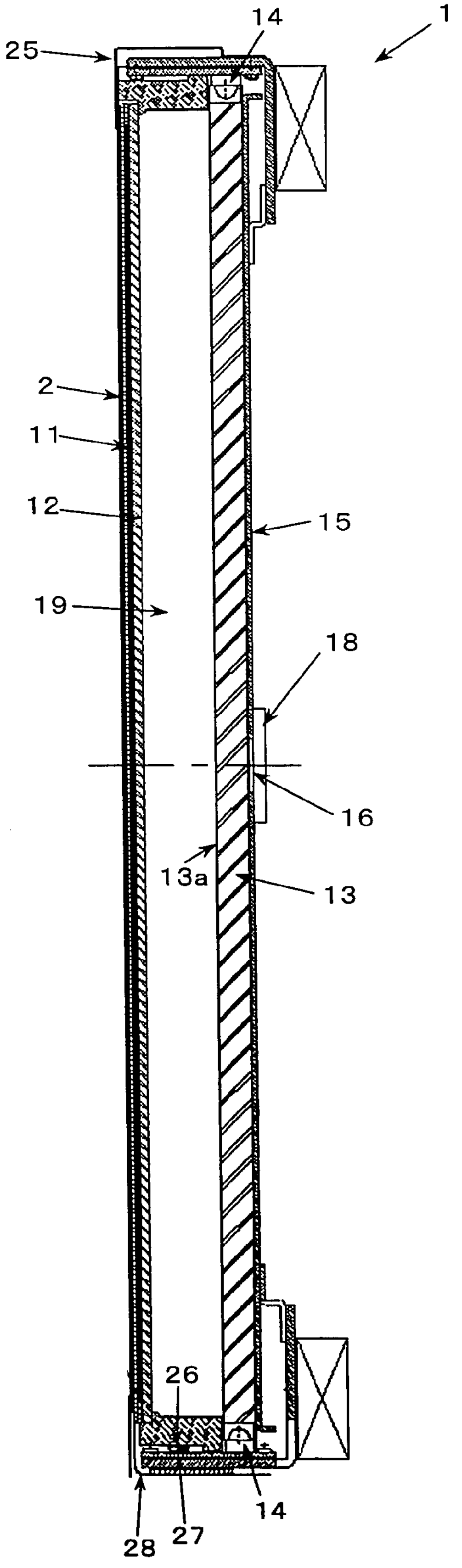
FIG. 7 is a cross section illustrating the configuration of the liquid crystal display device the second embodiment according to the invention.
Figure 8:
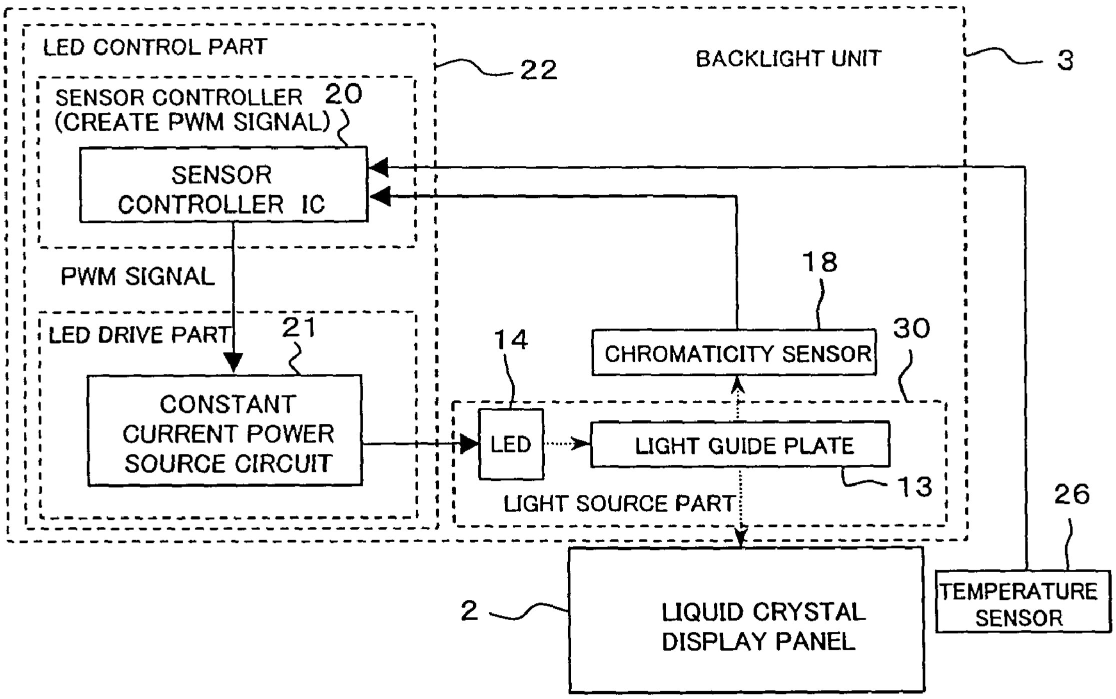
FIG. 8 is a block diagram illustrating the schematic configuration of the liquid crystal display device of the second embodiment according to the invention.

Next, a liquid crystal display device of a second embodiment according to the invention will be described with reference to FIGS. 6 to 8. In the embodiment, in the case in which the aging of the optical property of a liquid crystal display panel 2 can be ignored, changes in the wavelength property of liquid crystals due to temperature are determined beforehand, and the current amount to be carried through LEDs 14 is controlled based on the chromaticity of light and/or brightness from a light source part 30 and the temperature near a liquid crystal display panel 2. FIG. 6 is an exploded perspective view illustrating the configuration of a liquid crystal display device according to the embodiment, and FIG. 7 is a cross section illustrating the configuration of the liquid crystal display device according to the embodiment. Furthermore, FIG. 8 is a block diagram illustrating the schematic configuration of the liquid crystal display device according to the embodiment. As shown in FIGS. 6 to 8, the liquid crystal display device according to the embodiment has a temperature sensor 26 which senses the temperature near the liquid crystal display panel 2, and outputs a temperature signal. For example, the temperature sensor 26 is disposed on a printed circuit board 27 on which peripheral circuits are mounted. The printed circuit board 27 is connected to the liquid crystal display panel 2 through a flexible substrate 28 on which a driver IC is mounted. Moreover, in the embodiment, a sensor controller IC 20 of an LED control part 22 corrects a target value of chromaticity based on the temperature near the liquid crystal display panel 2 so as to cancel the temperature change in the optical property of the liquid crystal display panel 2. Furthermore, in the embodiment, it is different from the first embodiment in that the dummy liquid crystal panel 17 is not disposed and the light emitted from the back side of a light guide plate 13 through an opening 16 directly enters a chromaticity sensor (or brightness sensor) 18.

The chromaticity sensor 18 senses the chromaticity of light from the light guide plate 13, and outputs a chromaticity signal. The chromaticity signal outputted from the chromaticity sensor 18 is inputted to the sensor controller IC 20 of the LED control part 22. Furthermore, a temperature signal outputted from the temperature sensor 26 is also inputted to the sensor controller IC 20. The sensor controller IC 20 to which the chromaticity signal and the temperature signal are inputted corrects a preset target value of chromaticity based on the temperature near the liquid crystal display panel 2. Subsequently, the sensor controller IC 20 compares the chromaticity of light emitted from the light guide plate 13 with the corrected target value, determines the current amount to be carried through the R-LED, the G-LED and the B-LED so that the chromaticity becomes close to the corrected target value, and creates and outputs PWM signals. In addition, the target value may not be corrected based on the temperature. The current amount may be corrected based on the temperature in which a preset target value is used to determine the current amount and then the temperature change in the optical property of the liquid crystal display panel 2 is cancelled. The PWM signals outputted from the sensor controller IC 20 are inputted to a constant current power source circuit 21 of an LED drive part. The constant current power source circuit 21 flows a predetermined current to each of the R-LED, the G-LED and the B-LED based on the inputted PWM signals.

In the embodiment, the current amount to be carried through the LED 14 is controlled based on the chromaticity (or brightness) of light emitted from the light guide plate 13 and the temperature near the liquid crystal display panel 2. The target value of chromaticity is corrected so as to cancel the temperature change in the optical property of the liquid crystal display panel 2. Accordingly, even though temperature changes occur in the optical property of the liquid crystal display panel 2, the display brightness and display chromaticity of the liquid crystal display device are hardly varied, and stable display quality can be obtained.

The invention can be modified variously, not limited to the embodiment.

For example, in the embodiment, a sidelight backlight unit is taken as an example in which an LED is linearly disposed near the edge part of the light guide plate, but the invention is not limited thereto, which can be applied to a direct backlight unit as well.

What is claimed is:

1. An area lighting device comprising:

a light source part in a plane which has a plurality of LEDs and which is arranged to direct light towards a viewer in a first direction;

a dummy liquid crystal panel which has a pair of substrates and a liquid crystal layer encapsulated between the pair of the substrates, and to which light from the light source part partially enters from a second direction opposite to the first direction;

an optical sensor part which senses a chromaticity and/or brightness of light transmitted through the dummy liquid crystal panel; and an LED control part which controls the plurality of the LEDs based on the chromaticity and/or brightness; wherein the dummy liquid crystal panel is normally in a white mode and does not have a voltage applying part that applies a voltage to the liquid crystal layer.

2. The area lighting device according to claim 1, wherein the LED control part compares the chromaticity and/or brightness with a set target value, and controls the plurality of the LEDs so that the chromaticity and/or brightness becomes close to the target value.

3. The area lighting device according to claim 1, wherein the light source part has a plurality of LEDs with luminous colors different from one another.

4. The area lighting device according to claim 3, wherein the light source part has a red LED, a green LED and a blue LED.

5. The area lighting device according to claim 1, wherein the light source part has a light guide plate in a plane; and the plurality of the LEDs is linearly arranged near at least one end side of the light guide plate.

6. The area lighting device according to claim 5, further comprising a reflective sheet disposed on a back side of a light emitting surface of the light guide plate and having an opening through which light from the light guide plate is emitted; wherein the dummy liquid crystal panel is disposed adjacent to the opening.

7. A liquid crystal display device comprising:

an area lighting device; and a liquid crystal display panel illuminated by the area lighting device, wherein the area lighting device according to claim 1 is used as the area lighting device.

8. The liquid crystal display device according to claim 7, wherein an optical property of the dummy liquid crystal panel is almost the same as an optical property of the liquid crystal display panel.

* * * * *